United States Patent
Moon (10) Patent No.: US 11,036,319 B2
(45) Date of Patent: Jun. 15, 2021

(54) FLEXIBLE TOUCH SCREEN PANEL AND METHOD OF MANUFACTURING THE SAME

(71) Applicant: LG DISPLAY CO., LTD., Seoul (KR)

(72) Inventor: Younggyu Moon, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 16/218,033

(22) Filed: Dec. 12, 2018

(65) Prior Publication Data

US 2019/0179441 A1    Jun. 13, 2019

(30) Foreign Application Priority Data

Dec. 12, 2017    (KR) .................. 10-2017-0170489

(51) Int. Cl.
  *G06F 3/041*    (2006.01)
  *G06F 3/044*    (2006.01)

(52) U.S. Cl.
  CPC ............ *G06F 3/041* (2013.01); *G06F 3/0443* (2019.05); *G06F 3/0446* (2019.05); *G06F 2203/04102* (2013.01); *G06F 2203/04103* (2013.01); *G06F 2203/04111* (2013.01)

(58) Field of Classification Search
  CPC ....... G06F 12/0246; G06F 2203/04102; G06F 2203/04103; G06F 2203/04104; G06F 2203/04111; G06F 2203/04112; G06F 2212/7207; G06F 3/041; G06F 3/0412; G06F 3/0416; G06F 3/044; G06F 3/0443; G06F 3/0446; G09G 3/2003
  See application file for complete search history.

(56) References Cited

U.S. PATENT DOCUMENTS

| | | | | |
|---|---|---|---|---|
| 2011/0050625 | A1* | 3/2011 | Kim | ........................ G06F 3/044 345/174 |
| 2014/0000943 | A1 | 1/2014 | Kang et al. | |
| 2014/0145979 | A1* | 5/2014 | Lee | ....................... G06F 3/0412 345/173 |
| 2016/0322403 | A1* | 11/2016 | Gao | ......................... B32B 27/06 |
| 2017/0015818 | A1* | 1/2017 | Matsushita | ............... C08L 1/02 |
| 2018/0217703 | A1* | 8/2018 | Koike | ..................... G06F 3/044 |

FOREIGN PATENT DOCUMENTS

KR    10-2012-0070954 A    7/2012
KR    10-1191865 B1    10/2012

* cited by examiner

*Primary Examiner* — Kenneth Bukowski
(74) *Attorney, Agent, or Firm* — Birch, Stewart, Kolasch & Birch, LLP

(57) ABSTRACT

A flexible touch screen panel can include a flexible substrate including a plurality of trenches; first electrodes and second electrodes disposed in the plurality of trenches in the flexible substrate; an insulating film covering the first electrodes and the second electrodes; a contact hole in the insulating film to expose at least one of the first electrodes; and a bridge disposed on the insulating film, the bridge electrically connecting two of the first electrodes to each other through the contact hole.

19 Claims, 5 Drawing Sheets

FLEXIBLE TOUCH SCREEN PANEL AND METHOD OF MANUFACTURING THE SAME

This application claims the priority benefit of Korean Patent Application No. 10-2017-0170489 filed in the Republic of Korea on Dec. 12, 2017, the entire disclosure of which is hereby incorporated by reference herein for all purposes.

BACKGROUND OF THE INVENTION

Field of the Invention

The present disclosure relates to a flexible touch screen panel that is disposed in a flexible display device and gives a touch input function to the display device, and a method of manufacturing the same. More particularly, the present disclosure relates to a flexible touch screen panel having a structure for preventing wire defects due to over-etching and/or undercutting of a flexible substrate in forming a metal wire on the flexible substrate, and a method of manufacturing the same.

Discussion of the Related Art

Recently, various flat panel displays capable of reducing weight and volume, which are disadvantages of cathode ray tubes, have been developed. The flat panel displays may be implemented as a liquid crystal display (LCD), a field emission display (FED), a plasma display panel (PDP), an electroluminescent display, and the like. Particularly, a high-quality flat panel display using low temperature polycrystalline silicon (LTPS) as a channel layer is in the spotlight.

The liquid crystal display and the plasma display panel have limitations in the development of self-luminous elements having high flexibility and elasticity, and thus they are limited in applications as flexible display devices. However, an organic light emitting diode display is formed using an organic thin film, and it has been focused on as an optimum material that can be applied to a flexible display device using flexibility and elasticity characteristic of the organic thin film.

In a flexible organic light emitting diode display, it should have a characteristic that a display element is not damaged even if operations of easily bending and restoring to an original state are repeated. Therefore, unlike a typical flat panel display, it should have a robust structure in which the element is not damaged even in repeated bending operations. Here, the robust structure refers to a structure that ensures a long life so that a bending stressed area is weakened or external foreign matter (air or moisture) is not penetrated even if the bending operation is repeated, rather than simply increasing rigidity.

In addition, these flat panel displays interface with a user by using various input devices, such as a keyboard, a mouse, and a digitizer. However, use of a separate input device, such as the keyboard and the mouse, causes the inconvenience of acquiring knowledge about how to use it and occupying additional space, so that it is difficult to improve completeness of a product. Thus, there is a growing demand for input devices which are convenient and simple, and can reduce malfunctions. In accordance with such a demand, a touch screen panel in which a user directly touches a screen with a hand or a pen to input information has been proposed.

The touch screen panel is simple, has little malfunction, can be input without using a separate input device, and has enhanced convenience, in that the user can quickly and easily operate through content displayed on the screen. Therefore, the touch screen panel has been applied to various display devices due to the above conveniences.

The touch screen panel may be classified into a resistive type, in which a metallic electrode is formed on an upper plate or a lower plate, and a touched position is determined as a voltage gradient depending on a resistance while a DC voltage is applied, and a capacitive type, in which an equal potential is formed on a conductive film, a position where a voltage change of the upper and lower plate due to the touch occurs is sensed, and a touched part is sensed, and an electro-magnetic type in which a LC value derived as an electronic pen touches the conductive film is read and a touched part is sensed depending on a method of sensing a touched part.

Development of various display devices has been demanded by applying the touch screen panel to the flexible display device. As described above, the flexible display device should have a robust structure, in which the element is not damaged even in repeated bending operations. Therefore, the touch screen panel applied to the flexible display device should also have a robust structure, in addition to having a flexible characteristic.

SUMMARY OF THE INVENTION

One object of the present disclosure is to solve the problems of the related art described above, and to provide a flexible touch screen panel that is attached to a surface of a flexible display device and gives a touch input function. Another object of the present disclosure is to provide a flexible touch screen panel, in forming a metal wire on a flexible substrate, having a structure for preventing wire defects due to over-etching and/or undercutting of the flexible substrate.

In one aspect, there is provided a flexible touch screen panel including a flexible substrate having a plurality of trenches, first electrodes and second electrodes in which a part of thickness is disposed in the trenches of the flexible substrate on the flexible substrate, an insulating film covering the first electrodes and the second electrodes, a contact hole formed in the insulating film to expose each of the first electrodes, and a bridge which is disposed on the insulating film and connects the first electrodes to each other through the contact hole.

The flexible substrate can further include a protrusion protruding upward from lower surfaces of the first and second electrodes between the first electrodes and the second electrodes.

The protrusion can have a value of approximately $\frac{1}{10}$ to $\frac{3}{10}$ of a thickness of the first electrodes and the second electrodes.

A thickness of each the first electrodes and the second electrodes received in the trenches can be a value of approximately $\frac{1}{10}$ to $\frac{3}{10}$ of a total thickness of each the first electrodes and the second electrodes.

The first electrodes can be arranged on the flexible substrate in a first direction. The second electrodes can be arranged on the flexible substrate in a second direction crossing over the first direction.

In another aspect, there is provided a method of manufacturing a flexible touch screen panel including applying a sacrificial layer on a rigid substrate, applying a flexible substrate on the sacrificial layer, and patterning the flexible substrate with a half-tone mask to form a plurality of trenches recessed by a first thickness, applying a first metallic material on the flexible substrate and forming a first electrode and a second electrode received in the trenches, applying an insulating film on an entire surface of the flexible substrate to cover the first electrode and the second electrode, and forming a contact hole exposing a part of the first electrode, applying and patterning a second metallic material on the insulating film to form a bridge connecting the first electrode, and removing the sacrificial layer to separate the flexible substrate from the rigid substrate.

The trenches can be recessed downward from a surface of the flexible substrate by the first thickness. In forming the first electrode and the second electrode, a part of a thickness of the flexible substrate can be removed, so that the trenches can be formed to have a second thickness that is smaller than the first thickness.

The flexible touch screen panel according to embodiments of the present disclosure is attached to an outer surface of a flexible display device to give a touch input function. The flexible touch screen panel according to embodiments of the present disclosure can prevent over-etching and/or under-cutting in the flexible substrate in the process of patterning the electrodes. As a result, it is possible to maintain an insulation property of the insulating film that insulates the electrodes from the bridge, so that short-circuit between the touch electrodes and wire defects do not occur. In addition, the flexible touch screen panel according to embodiments of the present disclosure has a robust structure in which the electrodes are not peeled or damaged even if the bending operation is repeated.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE EMBODIMENTS

Advantages and features of the present disclosure and methods for accomplishing the same will become apparent with reference to embodiments described in detail below with reference to the accompanying drawings. The present disclosure is not limited to the embodiments disclosed below, and may be implemented in various forms. These embodiments are provided so that the present disclosure will be exhaustively and completely described, and will fully convey the scope of the present disclosure to those skilled in the art to which the present disclosure pertains.

Shapes, sizes, ratios, angles, number, and the like illustrated in the drawings for describing embodiments of the present disclosure are merely examples, and the present disclosure is not limited thereto. Like reference numerals designate like elements throughout the description.

In the following description, when a detailed description of well-known functions or configurations related to this document is determined to unnecessarily cloud a gist of the invention, the detailed description thereof will be omitted. In the present disclosure, when the terms "include," "have," "comprised of," etc. are used, other components may be added unless "only" is used. A singular expression can include a plural expression as long as it does not have an apparently different meaning in context.

In the explanation of components, even if there is no separate description, it is interpreted as including an error range. In the description of position relationship, when a structure is described as being positioned "on or above," "under or below," "next to" another structure, this description should be construed as including a situation in which the structures contact each other as well as a situation in which a third structure is disposed therebetween.

In the description of the embodiments, the terms "first," "second," etc. may be used to describe various components, but the components are not limited by such terms. These terms are only used to distinguish one component from another component. In addition, the component names used in the following description may be selected in consideration of easiness of specification, and may be different from the part names of actual products.

The features of various embodiments of the present disclosure can be partially combined or entirely combined with each other, and is technically capable of various interlocking and driving. In addition, the embodiments can be independently implemented, or can be implemented in conjunction with each other.

First Embodiment

Figure 1:
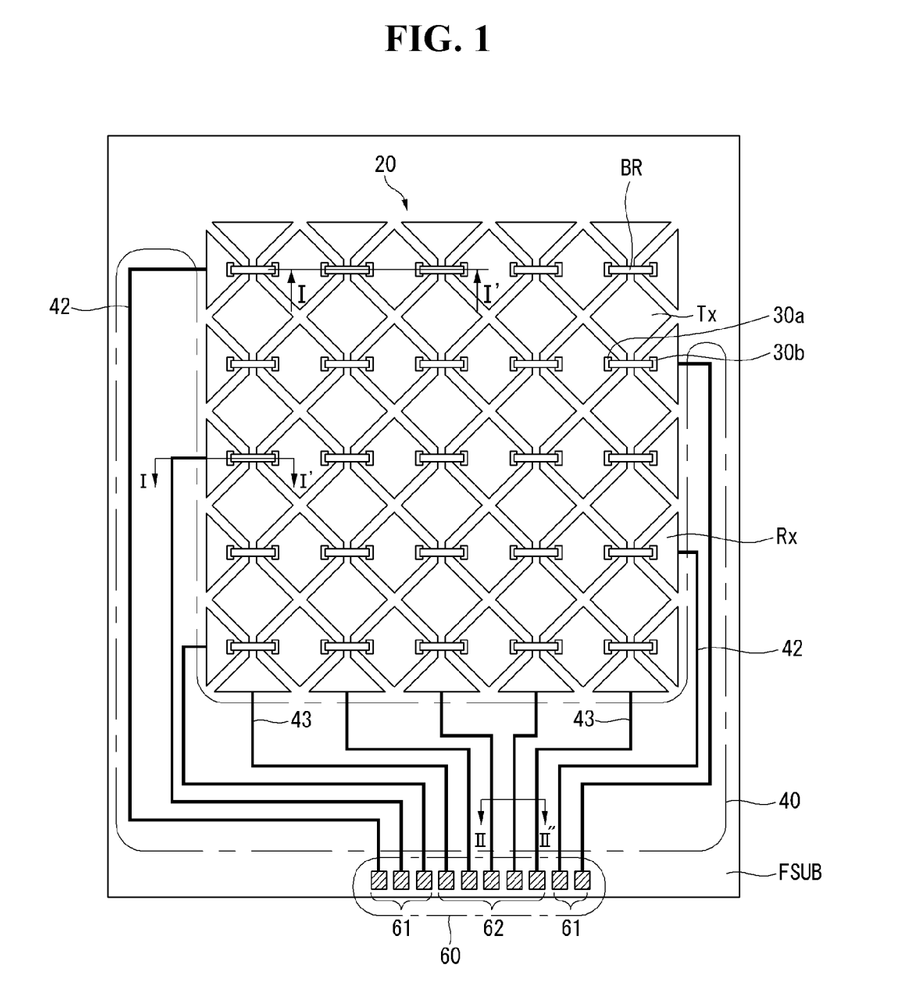
FIG. 1 is a plan view illustrating a structure of a flexible touch screen panel according to an embodiment of the present disclosure.
Figure 2A:
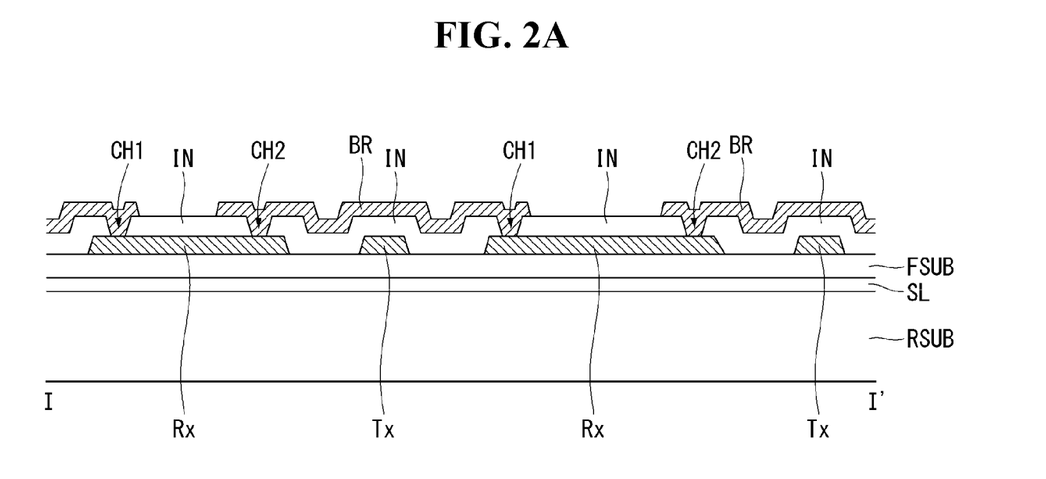
FIGS. 2A and 2B are cross-sectional views illustrating a manufacturing process of a flexible touch screen panel according to an embodiment of the present disclosure.
Figure 2B:
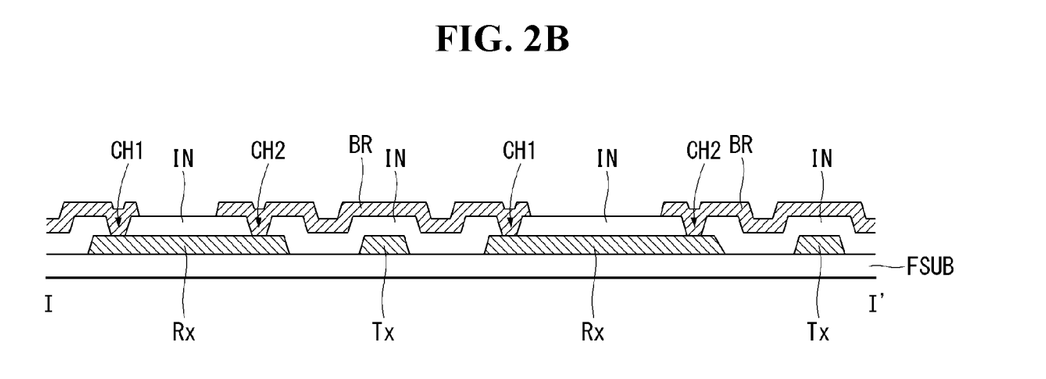

Hereinafter, referring to FIGS. 1, 2A and 2B, a flexible touch screen panel according to a first embodiment of the present disclosure will now be described. FIG. 1 is a plan view illustrating a structure of a flexible touch screen panel according to a first embodiment of the present disclosure. FIGS. 2A and 2B are cross-sectional views illustrating a manufacturing process of a flexible touch screen panel according to a first embodiment of the present disclosure, taken along a line I-I' of FIG. 1.

The flexible touch screen panel according to the first embodiment of the present disclosure includes an electrode part 20, a routing wire part 40, and a pad part 60 formed on a flexible substrate FSUB.

The electrode part 20 includes first electrodes Rx and second electrodes Tx formed on the flexible substrate FSUB. The first electrodes Rx are arranged in parallel in a first direction (e.g., an X-axis direction), and the second electrodes Tx are arranged to cross the first electrodes Rx in a second direction (e.g., a Y-axis direction). The first electrodes Rx and the second electrodes Tx crossing over each other but are electrically insulated by an insulating film IN. In addition, neighboring first electrodes Rx are connected to each other by a bridge BR. That is, the bridge BR interconnects the neighboring first electrodes Rx through contact holes CH1 and CH2 formed in the insulating film IN covering upper parts of the first and second electrodes Rx and Tx.

The routing wire part 40 is disposed on an outer periphery of the electrode part 20, and includes a plurality of first routing wires 42 connected to the plurality of first electrodes Rx and a plurality of second routing wires 43 connected to the plurality of second electrodes Tx.

The pad part 60 includes a plurality of first pads 61 connected to the plurality of first electrodes Rx through the plurality of first routing wires 42 and a plurality of second pads 62 connected to the plurality of second electrodes Tx through the plurality of second routing wires 43.

In addition, a protective layer whichcovers the electrode part 20 and the routing wire part 40, and prevents the first and second electrodes Rx and Tx and the first and second routing wires 42 and 43 from being exposed to outside can be stacked on an uppermost layer.

Hereinafter, referring to FIGS. 2A and 2B, a manufacturing process of the flexible touch screen panel according to the first embodiment of the present disclosure will be described.

First, a rigid substrate RSUB, such as glass or rigid plastic, is prepared. A sacrificial layer SL is applied on the rigid substrate RSUB. The sacrificial layer SL can include a semiconductor material such as amorphous silicon that can be easily removed by changing its phase when a predetermined energy is applied.

A flexible substrate FSUB is formed on the sacrificial layer SL. The flexible substrate FSUB is applied on the sacrificial layer SL in a form of a film using an organic material with high flexibility such as polyimide.

A metallic material is applied and patterned on the flexible substrate FSUB to form the first electrodes Rx and the second electrodes Tx. Each of the first electrodes Rx can be independently formed. Further, the second electrodes Tx can be connected to each other in the Y axis direction. An insulating film IN is applied on an entire surface of the flexible substrate FSUB to cover the first and second electrodes Rx and Tx. The insulating film IN is patterned to form a first contact hole CH1 and a second contact hole CH2, which expose both ends of each of the first electrodes Rx.

A metallic material is applied and patterned on the insulating film IN to form bridges BR connecting the first electrodes Rx along the X axis direction. (See FIG. 2A) Also, after the bridge BR is completed, a protective film can be stacked to cover the entire surface of the flexible substrate FSUB.

Thereafter, a laser beam is irradiated to the sacrificial layer SL interposed between the rigid substrate RSUB and the flexible substrate FSUB. As a result, the flexible substrate FSUB is separated from the rigid substrate RSUB, thereby completing the flexible touch screen panel (e.g., see FIG. 2B).

In addition, the flexible touch screen panel can be attached to an outer surface of a flexible display device, thereby completing the flexible display device having a touch screen function.

Second Embodiment

Figure 3:
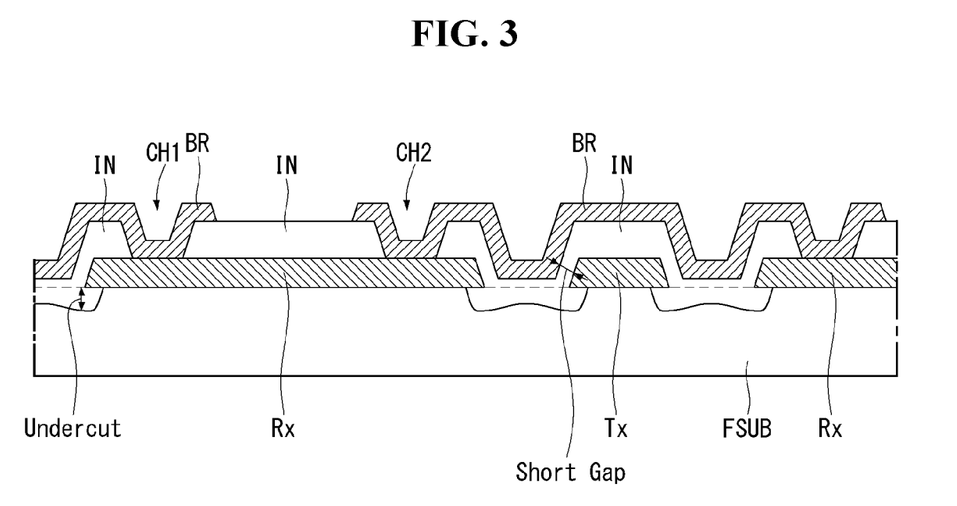
FIG. 3 is an enlarged cross-sectional view illustrating a structure of wire defects due to over-etching and/or under-cutting of a flexible substrate that can occur in an embodiment of the present disclosure.

In the first embodiment described above, in the process of forming the first and second electrodes Rx and Tx on the flexible substrate FSUB, over-etching and/or undercutting phenomenon may occur in the flexible substrate FSUB. Hereinafter, an influence of the over-etching and/or undercutting occurrence will be described with reference to FIG. 3. FIG. 3 is an enlarged cross-sectional view illustrating a structure of wire defects due to over-etching and/or under-cutting of a flexible substrate that can occur in a first embodiment of the present disclosure.

After depositing a metallic material on the flexible substrate FSUB, a first electrode Rx and a second electrode Tx are formed by patterning the metallic material by photolithography. At this time, over-etching may occur due to a material characteristic of the flexible substrate FSUB. Also, an undercutting phenomenon that penetrates to the bottom of a metal layer may occur at edge parts of the first electrode Rx and the second electrode Tx.

When an insulating film IN is applied when the over-etching and/or undercutting has occurred, the insulating film IN at the edge parts of the first electrode Rx and the second electrode Tx may be thinner than a desired thickness. As a result, when a bridge BR is formed on the insulating film IN, a short gap may occur between the bridge BR and the second electrode Tx.

The bridge BR connects the first electrodes Rx and should maintain an insulation state with respect to the second electrode Tx. However, in a situation described in FIG. 3, an insulation distance between the bridge BR and the second electrode Tx is too narrow, so that the insulation state is bad or if severe, a short may occur. In this instance, a touch function of the touch screen panel may be lost. For example, due to repeated bending and the short gap, the bridge BR that connects adjacent first electrodes Rx could accidentally make electrical contact with the second electrode Tx.

Hereinafter, referring to FIGS. 4 and 5A to 5D, a flexible touch screen panel according to a second embodiment having a structure capable of maintaining insulation between the bridge BR and the second electrode Tx, and preventing over-etching and undercutting in the flexible substrate FSUB will be described.

Figure 4:
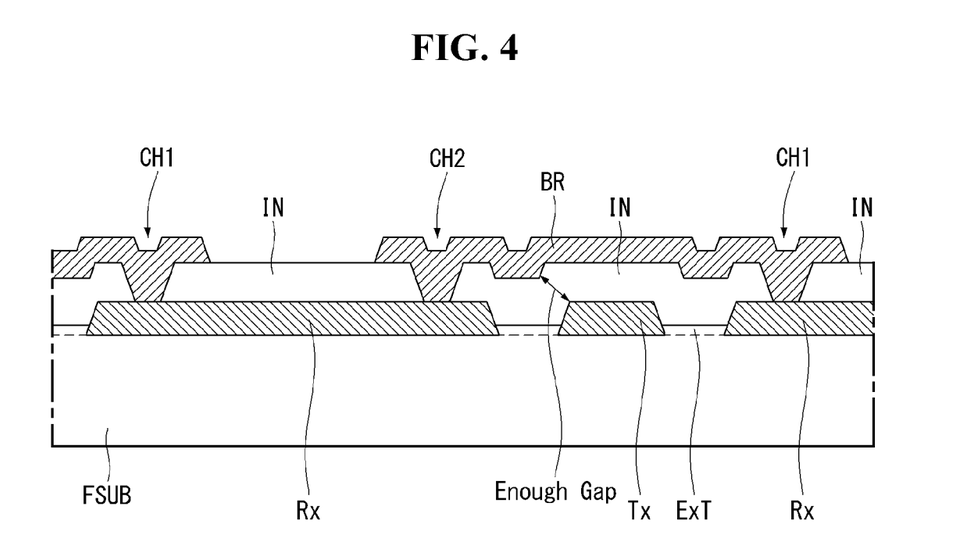
FIG. 4 is a cross-sectional view illustrating a structure of a flexible touch screen panel according to another embodiment of the present disclosure.

FIG. 4 is a cross-sectional view illustrating a structure of a flexible touch screen panel according to a second embodiment of the present disclosure. Since a plan view structure is the same as that of the first embodiment, it is not separately shown, but referred to FIG. 1.

Referring to FIG. 4, a flexible touch screen panel according to a second embodiment of the present disclosure includes first electrodes Rx and second electrodes Tx formed on a flexible substrate FSUB. Here, the first electrodes Rx can have a polygonal shape arranged in the X-axis direction of the flexible substrate FSUB. The second electrodes Tx can have a polygonal shape arranged in the Y-axis direction of the flexible substrate FSUB. The first electrodes Rx are connected to each other by a bridge BR, and the second electrodes Tx can have a continuous shape on the same layer.

The first and second electrodes Rx and Tx can have a structure in which a part of their lower layers is received in trenches below an upper surface of the flexible substrate FSUB (e.g., the first and second electrodes Rx and Tx can be embedded in the flexible substrate FSUB so that lowermost surfaces of the first and second electrodes Rx and Tx are lower than an uppermost surface of the flexible substrate FSUB). An insulating film IN is stacked on an entire surface of the flexible substrate FSUB to cover the first and second electrodes Rx and Tx. A first contact hole CH1 and a second contact hole CH2 are formed in the insulating film IN to expose both sides of each of the first electrodes Rx.

The bridge BR is stacked on the insulating film IN, and the bridge BR contacts each of the first electrodes Rx through the first contact hole CH1 and the second contact hole CH2, thereby electrically connecting the first electrodes Rx in the X-axis direction.

As shown in FIG. 4, the flexible substrate FSUB has a protrusion EXT protruding upward from a lower surface of the electrodes Rx and Tx between the first electrode Rx and the second electrode Tx. Therefore, a thickness of the insulating film IN does not decrease at edge parts of the first and second electrodes Rx and Tx, thereby the structure is capable of maintaining enough of a gap between the bridge and the second electrode Tx. For example, the bridge includes two protrusions extending towards two protrusions of the flexible substrate, and the two protrusions of the bridge overlap with the two protrusions of the flexible substrate, respectively, with the insulating film disposed therebetween, and the protrusions of the flexible substrate can "push up" corresponding portions of the insulating film to help keep the protrusions of the bridge safely away from the second electrodes to better prevent potential electrical shorts that could occur during repeated bending (e.g., the sets of protrusions form a structure having a shape similar to fangs). As a result, the bridge BR can bridge over the second electrode Tx while connecting the first electrodes Rx and maintain a sufficient insulation state with respect to the second electrode Tx.

The flexible touch screen panel according to embodiments of the present disclosure can be attached to a surface of a flexible display device. The flexible display device often repeats a bending operation. At this time, the flexible touch screen panel also repeats the bending operation. In this instance, the gap between the first electrodes Rx and the second electrodes Tx can be firmly maintained by the protrusion Ext between the first electrodes Rx and the second electrodes Tx. That is, there are no problems with regard to the electrodes on the touch screen panel being damaged or easily peeled off, even in repeated bending operations.

It is preferable that the protrusion EXT for securing insulation performance of the bridge BR and preventing the damage of the first electrodes Rx and the second electrodes Tx, as described above, is not too thin or too thick relative to the first and second electrodes Rx and Tx. For example, the protrusion EXT is can be approximately $\frac{1}{10}$ to $\frac{3}{10}$ of a thickness of the first and second electrodes Rx and Tx.

Hereinafter, referring to FIGS. 5A to 5D, a manufacturing process of the flexible touch screen panel according to the second embodiment of the present disclosure will be described. FIGS. 5A to 5D are cross-sectional views illustrating a manufacturing process of a flexible touch screen panel according to a second embodiment of the present disclosure.

Figure 5A:
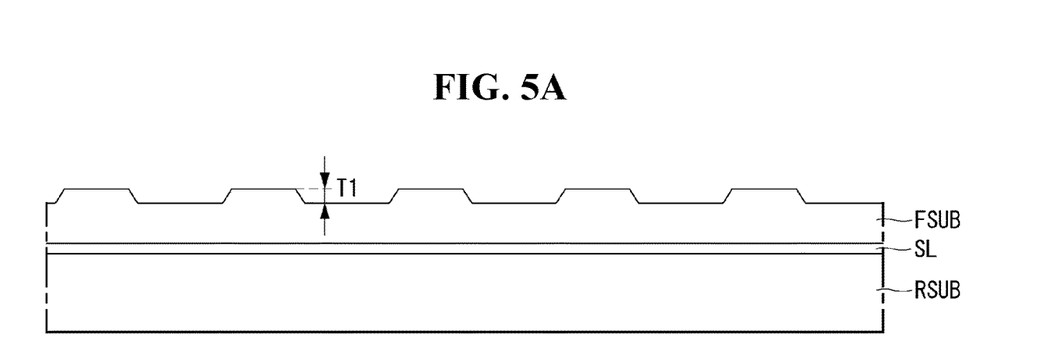
FIGS. 5A to 5D are cross-sectional views illustrating a manufacturing process of a flexible touch screen panel according to an embodiment of the present disclosure.

First, a rigid substrate RSUB, such as glass or rigid plastic, is prepared. A sacrificial layer SL is applied on the rigid substrate RSUB. The sacrificial layer SL can include a semiconductor material such as amorphous silicon that can be easily removed by changing its phase when a predetermined energy is applied. A flexible substrate FSUB is applied on the sacrificial layer SL. The flexible substrate FSUB is stacked on the sacrificial layer SL in a form of a film using an organic material with high flexibility such as polyimide. The flexible substrate FSUB is patterned by using a half-tone mask to form trenches recessed by a first thickness T1 at a part where the first and second electrodes Rx and Tx are to be formed (FIG. 5A).

Figure 5B:
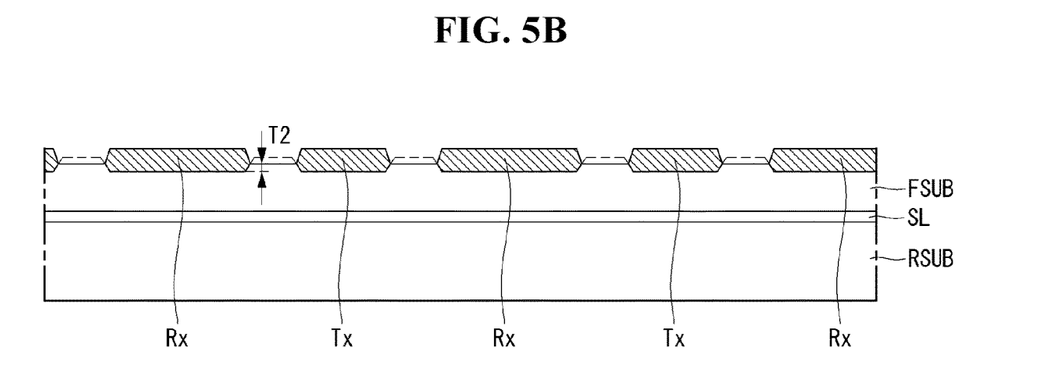

A metallic material is applied on the flexible substrate FSUB, from which the trenches are formed. The metallic material is patterned by a mask process to form the first electrodes Rx and the second electrodes Tx. Each of the first electrodes Rx can be independently formed. Further, the second electrodes Tx can be connected to each other in the Y axis direction. In particular, it is preferable that the first electrodes Rx and the second electrodes Tx are arranged in a trench part. At this time, in an etching process for forming the first electrodes Rx and the second electrodes Tx, a thickness of the flexible substrate SUB exposed between the first electrodes Rx and the second electrodes Tx may be reduced. That is, a part protruded by the first thickness T1 may be lowered to a second thickness T2 (FIG. 5B). For example, the protrusions between trenches can provide a safe margin, even if some over etching occurs (e.g., undercutting around the edges of the electrodes can be prevented).

Figure 5C:
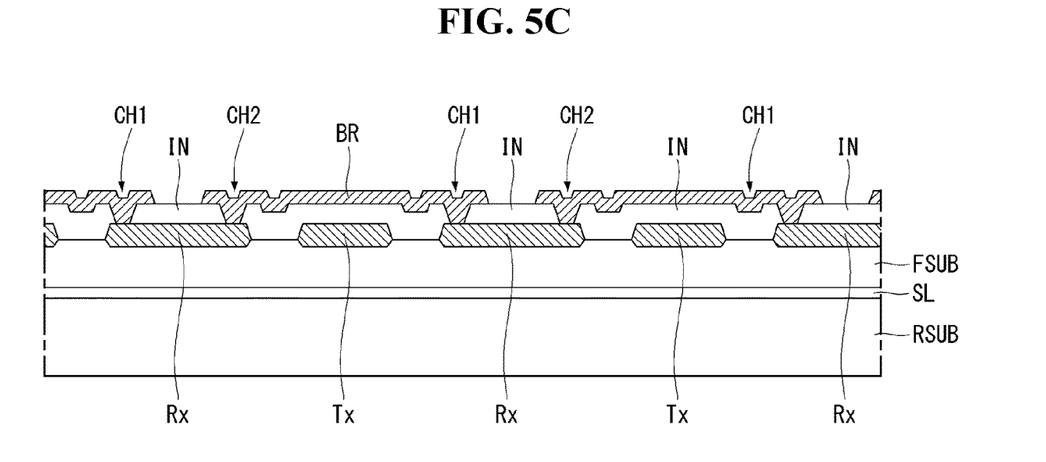
Figure 5D:
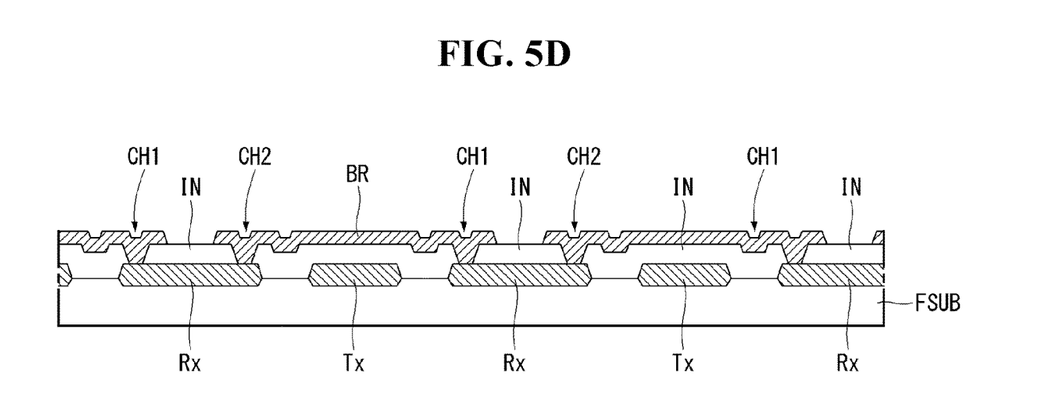

An insulating film IN is applied on an entire surface of the flexible substrate FSUB to cover the first and second electrodes Rx and Tx. The insulating film IN is patterned to form a first contact hole CH1 and a second contact hole CH2 which expose both end sides of each of the first electrodes Rx (FIG. 5C).

A metallic material is applied and patterned on the insulating film IN to form bridges BR connecting the first electrodes Rx along the X axis direction. In addition, after the bridge BR is completed, a protective film can be stacked to cover the entire surface of the flexible substrate FSUB. Thereafter, a laser beam is irradiated to the sacrificial layer SL interposed between the rigid substrate RSUB and the flexible substrate FSUB. As a result, the flexible substrate FSUB is separated from the rigid substrate RSUB, thereby completing the flexible touch screen panel (See FIG. 5D).

In addition, the flexible touch screen panel can be attached to an outer surface of a flexible display device, thereby completing the flexible display device having a touch screen function.

In the flexible touch screen panel according to embodiments of the present disclosure, a robust structure, in which the electrode is not peeled or damaged even if the bending operation is repeated, is described. However, the present disclosure is not limited thereto, and the robust structure can be applied to a curved touch screen panel or a flat touch screen panel.

While embodiments of the present invention has been described in detail with reference to the drawings, it will be understood by those skilled in the art that the invention can be implemented in other specific forms without changing the technical spirit or features of the invention. Therefore, it should be noted that the forgoing embodiments are merely illustrative in all aspects and are not to be construed as limiting the invention. The scope of the invention is defined by the appended claims rather than the detailed description of the invention. All changes or modifications or their equivalents made within the meanings and scope of the claims should be construed as falling within the scope of the invention.

What is claimed is:
1. A flexible touch screen panel comprising:
   a flexible substrate including a plurality of trenches and two protrusions;
   first electrodes and second electrodes disposed in the plurality of trenches in the flexible substrate;
   an insulating film covering the first electrodes and the second electrodes;
   a contact hole in the insulating film to expose at least one of the first electrodes; and
   a bridge disposed on the insulating film, the bridge electrically connecting two of the first electrodes to each other through the contact hole,
   wherein an upper surface of the bridge includes a plurality of depressions,
   wherein two depressions of the plurality of depressions in the upper surface of the bridge overlap with the two protrusions of the flexible substrate, respectively, wherein an upper surface of each of the two protrusions is lower than upper surfaces of the first electrodes and the second electrodes, wherein an embedded thickness amount of each of the first electrodes and the second electrodes into the plurality of trenches is a part of a total thickness of each of the first electrodes and the second electrodes, and wherein the two protrusions of the flexible substrate each have a reverse-tapered shape.

2. The flexible touch screen panel of claim 1, wherein one protrusion of the plurality of protrusions of the flexible substrate is disposed between one of the first electrodes and one of the second electrodes, the one protrusion protruding away from lower surfaces of the first and second electrodes.

3. The flexible touch screen panel of claim 2, wherein the one protrusion has a thickness of approximately $1/10$ to $3/10$ of a thickness of the first electrodes and the second electrodes.

4. The flexible touch screen panel of claim 2, wherein the one protrusion and a portion of the insulating film are configured to raise a height of part of the bridge, and separate the bridge from the one of the second electrodes by a predetermined gap distance.

5. The flexible touch screen panel of claim 2, wherein a first side surface of the one protrusion directly contacts a side surface of the one of the first electrodes and a second side surface of the one protrusion directly contacts a side surface of the one of the second electrodes, and wherein the first side surface of the one protrusion is opposite to the second side surface of the one protrusion.

6. The flexible touch screen panel of claim 1, wherein the embedded thickness amount of each of the first electrodes and the second electrodes in the plurality of trenches is approximately $1/10$ to $3/10$ of the total thickness of each of the first electrodes and the second electrodes.

7. The flexible touch screen panel of claim 1, wherein the first electrodes are arranged on the flexible substrate in a first direction, and wherein the second electrodes are arranged on the flexible substrate in a second direction crossing over the first direction.

8. The flexible touch screen panel of claim 1, wherein the bridge has an uneven upper surface and an uneven lower surface.

9. The flexible touch screen panel of claim 1, wherein the flexible substrate the two protrusions are disposed on opposite sides of one of the second electrodes.

10. The flexible touch screen panel of claim 9, wherein the bridge includes two protrusions extending towards the two protrusions of the flexible substrate in a lower surface, and wherein the two protrusions of the bridge overlap with the two protrusions of the flexible substrate, respectively.

11. The flexible touch screen panel of claim 9, wherein the second electrodes each have a tapered shape relative to a lower surface of the flexible substrate.

12. The flexible touch screen panel of claim 11, wherein a cross section of each of the second electrodes has a trapezoid shape.

13. The flexible touch screen panel of claim 9, wherein the upper surface of the bridge includes four depressions, the two depressions being included among the four depressions.

14. A method of manufacturing a flexible touch screen panel, the method comprising:

applying a sacrificial layer on a rigid substrate;
applying a flexible substrate on the sacrificial layer;
patterning the flexible substrate with a half-tone mask to form a plurality of trenches in the flexible substrate, wherein the plurality of trenches each have a depth of a first thickness;
applying a first metallic material on the flexible substrate;
patterning the first metallic material to form a first electrode and a second electrode in the plurality of trenches;
applying an insulating film on an entire surface of the flexible substrate to cover the first electrode and the second electrode;
forming a contact hole in the insulating film exposing a part of the first electrode;
applying a second metallic material on the insulating film;
patterning the second metallic material to form a bridge connected to the first electrode, and
removing the sacrificial layer to separate the flexible substrate from the rigid substrate,
wherein the applying and patterning the second metallic material to form the bridge includes forming two depressions in an upper surface of the bridge, and
wherein the plurality of trenches are recessed downward from a surface of the flexible substrate by the first thickness, and
in forming the first electrode and the second electrode, a part of a thickness of the flexible substrate is removed, and the plurality of trenches are formed to have a second thickness that is smaller than the first thickness.

15. The method of claim 14, wherein the removing the sacrificial layer includes irradiating a laser to the sacrificial layer interposed between the rigid substrate and the flexible substrate.

16. The method of claim 14, wherein the applying and patterning the second metallic material to form the bridge further includes:

forming two protrusions extending from a lower surface of the bridge towards two protrusions of the flexible substrate on opposite sides of the second electrode,
wherein the two depressions respectively overlap with the two protrusions of the flexible substrate on opposite sides of the second electrode.

17. The method of claim 14, wherein the patterning the first metallic material to form the first electrode and the second electrode in the plurality of trenches includes:

forming the second electrode in one of the plurality of trenches with opposite sides of the second electrode directly contacting two different protrusions of the flexible substrate.

18. The method of claim 14, wherein the first thickness of each of the plurality of trenches in the flexible substrate is approximately $1/10$ to $3/10$ of a thickness of the first electrodes and the second electrodes.

19. A flexible touch screen panel comprising:

a flexible substrate including a plurality of trenches disposed in a surface of the flexible substrate;
first electrodes and second electrodes disposed in the plurality of trenches in the flexible substrate;
an insulating film covering the first electrodes and the second electrodes;
a bridge disposed over a portion of one of the second electrodes on the insulating film;
two protrusions protruding from the flexible substrate, the two protrusions being disposed on opposite sides of one of the second electrodes;
two protrusions protruding from the bridge in a direction toward the two protrusions protruding from the flexible substrate;

two depressions in an upper surface of the bridge depressed toward and overlap with the two protrusions protruding from the flexible substrate,
wherein an upper surface of each of the two protrusions is lower than upper surfaces of the first electrodes and the second electrodes,
wherein an embedded thickness amount of each of the first electrodes and the second electrodes into the plurality of trenches is a part of a total thickness of each of the first electrodes and the second electrodes, and
wherein the two protrusions of the flexible substrate each have a reverse-tapered shape.

* * * * *